(12) United States Patent
Matsumoto et al.

(10) Patent No.: US 7,017,919 B2
(45) Date of Patent: Mar. 28, 2006

(54) CHUCK

(75) Inventors: Masakazu Matsumoto, Daito (JP);
Masahiro Taguchi, Daito (JP); Yusaku Yamamoto, Daito (JP)

(73) Assignee: Nikken Kosakusho Works Ltd., Daito (JP)

( * ) Notice: Subject to any disclaimer, the term of this patent is extended or adjusted under 35 U.S.C. 154(b) by 0 days.

(21) Appl. No.: 10/909,733

(22) Filed: Aug. 1, 2004

(65) Prior Publication Data

US 2005/0073115 A1    Apr. 7, 2005

(30) Foreign Application Priority Data

Oct. 1, 2003  (JP) .............................. 2003-343333

(51) Int. Cl.
*B23B 31/117* (2006.01)
(52) U.S. Cl. ....................... 279/9.1; 279/102; 279/103; 279/903
(58) Field of Classification Search ................ 279/9.1, 279/102, 103, 903; 409/234
See application file for complete search history.

(56) References Cited

U.S. PATENT DOCUMENTS

| | | | | | |
|---|---|---|---|---|---|
| 3,523,693 | A | * | 8/1970 | Sykes | 279/9.1 |
| 4,630,980 | A | * | 12/1986 | Kubo | 409/234 |
| 4,660,840 | A | * | 4/1987 | Mizoguchi | 279/9.1 |
| 4,721,423 | A | * | 1/1988 | Kubo | 409/234 |
| 4,865,336 | A | * | 9/1989 | Keritsis | 279/9.1 |
| 5,158,408 | A | * | 10/1992 | Naito | 409/234 |
| 5,335,922 | A | * | 8/1994 | Unate | 279/9.1 |
| 6,071,219 | A | * | 6/2000 | Cook | 483/1 |
| 6,105,974 | A | * | 8/2000 | Matsumoto | 279/9.1 |
| 6,109,842 | A | * | 8/2000 | Cook | 409/131 |
| 6,131,916 | A | * | 10/2000 | Toda | 279/9.1 |
| 6,352,395 | B1 | * | 3/2002 | Matsumoto et al. | 409/234 |
| 6,382,888 | B1 | * | 5/2002 | Cook | 409/141 |
| 2004/0164502 | A1 | * | 8/2004 | Taguchi et al. | 279/52 |

FOREIGN PATENT DOCUMENTS

| JP | 63169205 A | * | 7/1988 |
|---|---|---|---|
| JP | 02053503 A | * | 2/1990 |

* cited by examiner

*Primary Examiner*—Boyer D. Ashley
*Assistant Examiner*—Michael W. Talbot
(74) *Attorney, Agent, or Firm*—Roth & Goldman, P.A.

(57) ABSTRACT

A chuck includes a holder body, a clamp sleeve, and a large number of needle rollers. The holder body has a shank portion, a flange, and a chuck sleeve. The clamp sleeve is fitted onto the outer circumference of the chuck sleeve such that the clamp sleeve is rotatable and axially movable relative to the chuck sleeve. The needle rollers are disposed between the chuck sleeve and the clamp sleeve over the entire circumference. The clamp sleeve is rotated to cause the needle rollers to revolve spirally along the outer circumferential surface of the chuck sleeve while rotating about their own axes in order to decrease and restore the diameter of the chuck sleeve. A thrust member is disposed between the end surface of the flange opposite the shank portion and a corresponding end surface of the clamp sleeve.

4 Claims, 12 Drawing Sheets

CHUCK

BACKGROUND OF THE INVENTION

1. Field of the Invention

The present invention relates to a chuck for chucking a cutting tool such as a drill or end mill, and more particularly to a chuck in which a clamp sleeve is fitted onto the outer circumference of a chuck sleeve of a holder body via needle rollers, and in which, through rotation of the clamp sleeve in a clamping direction, the diameter of the chuck sleeve is reduced in order to tightly chuck a desired tool.

2. Description of the Related Art

Figure 12:
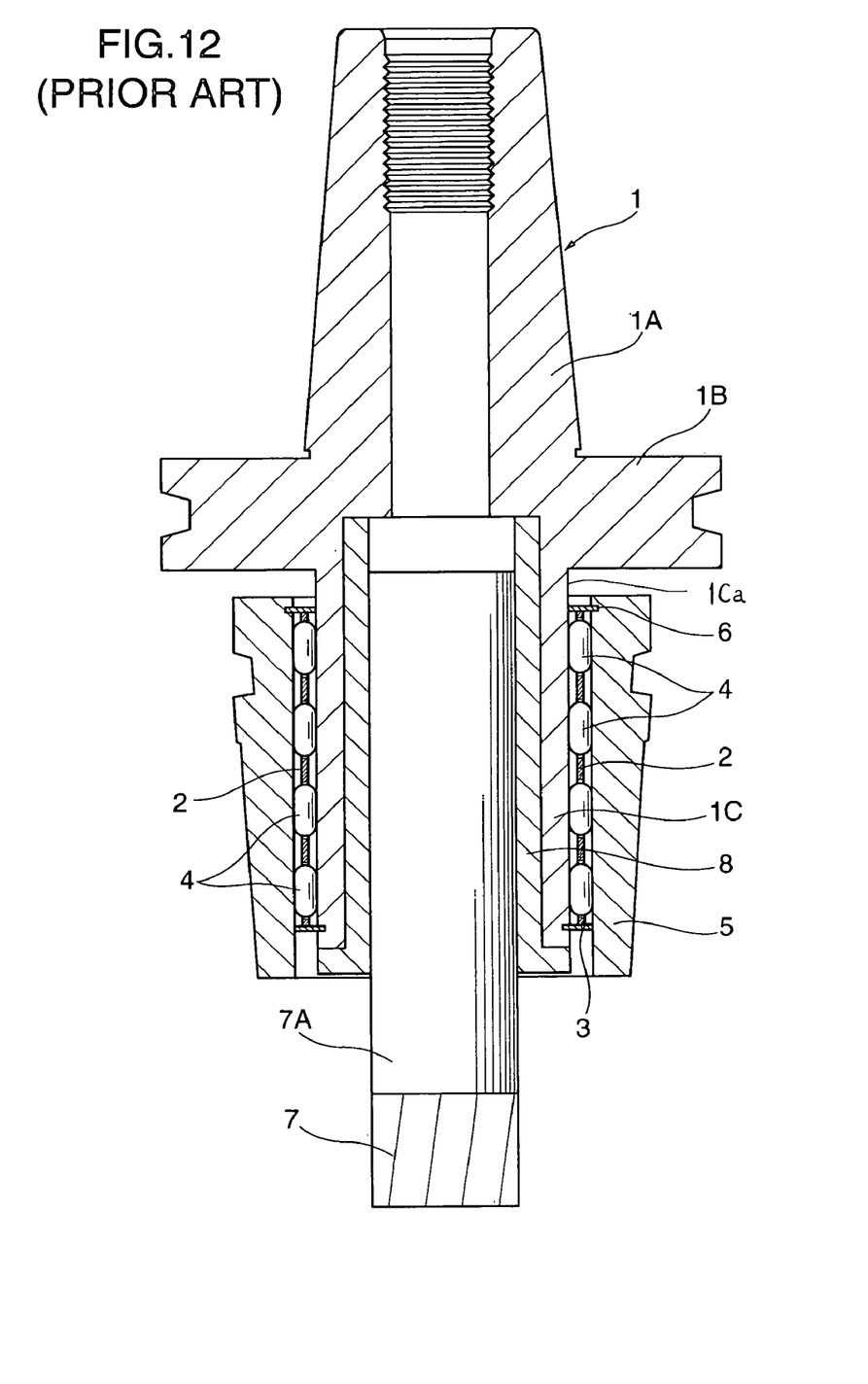
FIG. 12 is a cross-sectional view of a conventional chuck.

A conventional chuck will be described with reference to FIG. 12. FIG. 12 is a cross-sectional view of a conventional tool chuck.

As shown in FIG. 12, the tool chuck has a holder body 1. The tool holder body 1 has a tapered shank portion 1A to be inserted into a spindle of an unillustrated machine tool, a gripping flange 1B formed at the larger-diameter end of the tapered shank portion 1A, and a chuck sleeve 1C that extends from the end surface of the flange 1B opposite the tapered shank portion 1A. The chuck sleeve 1C extends in the direction away from the tapered shank portion 1A such that the axis of the chuck sleeve 1C coincides with the axis of the tapered shank portion 1A. A tapered surface 1Ca is formed on the outer circumference of the chuck sleeve 1C such that the diameter of the surface 1Ca decreases toward the tip end thereof.

Reference numeral 2 denotes a roller-retaining sleeve which is fitted onto the outer circumference of the chuck sleeve 1C with a clearance therebetween. The diameter of the roller-retaining sleeve 2 decreases toward the tip end thereof substantially at the same rate as that of the tapered surface 1Ca of the chuck sleeve 1C. The roller-retaining sleeve 2 is held by a retainer ring 3 provided on the outer circumference of the tip end portion of the chuck sleeve 1C such that the roller-retaining sleeve 2 is prevented from coming off the chuck sleeve 1C.

In the roller-retaining sleeve 2, numerous needle rollers 4 are disposed to form a plurality of rows. The needle rollers are fitted into the roller-retaining sleeve 2 in such a manner that the needle rollers incline in the circumferential direction at a predetermined angle with respect to the center axis of the roller-retaining sleeve 2. Each of the needle rollers 4 has a diameter greater than the wall thickness of the roller-retaining sleeve 2, so that the portion of each needle roller 4 projecting inward from the inner circumferential surface of the roller retaining sleeve 2 is in contact with the tapered surface 1Ca of the chuck sleeve 1C, while the portion of each needle roller 4 projecting outward from the outer circumferential surface of the roller retaining-sleeve 2 is in contact with the inner circumferential surface of a clamp sleeve 5, which will be described below.

The clamp sleeve 5 is adapted to reduce the diameter of the chuck sleeve 1C to thereby tightly chuck a desired tool. The clamp sleeve 5 is fitted onto the outer circumference of the chuck sleeve 1C via the needle rollers 4 held by the roller-retaining sleeve 2. The clamp sleeve 5 has a tapered inner circumferential surface whose diameter decreases from the end facing the flange 1B toward the tip end thereof. Further, a sealing/retaining ring 6 is attached to the inner circumference of the bottom end portion of the clamp sleeve 5 adjacent to the flange 1B. The sealing/retaining ring 6 is in contact with the outer circumferential surface of the chuck sleeve 1C so as to provide a sealing function. The sealing/retaining ring 6 also abuts the end surface of the roller retaining sleeve 2 in order to prevent the clamp sleeve 5 from coming off the chuck sleeve 1C.

In the conventional chuck having the above-described structure, when a tool 7 is to be chucked, a spring collet 8 is fitted onto the shank 7A of the tool 7, and the shank 7A of the tool 7, together with the spring collet 8, is inserted into the cylindrical bore of the chuck sleeve 1C. When the clamp sleeve 5 is rotated clockwise, each needle roller 4 in contact with the tapered inner surface of the clamp sleeve 5 revolves spirally along the outer surface of the chuck sleeve 1C while rotating about its own axis. Thus, the roller-retaining sleeve 2 moves toward the flange 1B, while rotating, in accordance with the revolution of the needle rollers 4, and at the same time the clamp sleeve 5 also moves toward the flange 1B. The movements of the roller-retaining sleeve 2 and the clamp sleeve 5 toward the flange 1B reduce the clearance between the tapered inner surface of the clamp sleeve 5 and the tapered outer surface of the chuck sleeve 1C, so that the clamp sleeve 5 strongly presses the chuck sleeve 1C from the entire outer circumference thereof via the needle rollers 4 in order to reduce the diameter of the chuck sleeve 1C. As a result, the shank 7A of the tool 7 inserted into the cylindrical bore of the chuck sleeve 1C is clamped and held by the chuck sleeve 1C via the spring collet 8. When the clamp sleeve 5 in a clamped state is rotated counterclockwise, the roller-retaining sleeve 2 moves toward the tip end of the chuck sleeve 1C, and the clamp sleeve 5 also moves in the same direction. Therefore, the diameter of the chuck sleeve 1C is restored to its original size, so that the clamping force applied to the tool 7 is released. This enables the tool 7 to be removed from the chuck sleeve 1C or to be replaced with a different tool.

In such a conventional chuck, the chuck sleeve 1C extends from the end surface of the flange 1B opposite the tapered shank portion 1A. Therefore, within an area of the tapered surface 1Ca adjacent to the base portion of the chuck sleeve 1C continuous with the flange 1B, the rigidity against elastic deformation in the radial direction is considerably higher than that in the remaining area. Therefore, when the clamp sleeve 5 is rotated in the clamping direction so as to reduce the diameter of the chuck sleeve 1C, within the above-described area of the tapered surface 1Ca the ratio of reduction in diameter is very small as compared to that in the remaining area.

In order to solve the above-described drawback, one of the present inventors has proposed an improved chuck as shown in U.S. Pat. No. 6,105,974. In the improved chuck, a groove having a predetermined depth is formed in the end surface of the flange opposite the shank portion such that the groove extends along the outer circumference of the bottom end of the chuck sleeve through which the chuck sleeve is joined with the flange. Since the groove increases the effective chucking length of the chuck sleeve; i.e., the length of a portion of the chuck sleeve in which the chuck sleeve can elastically deform in a diameter-reducing direction, elastic deformation of the chuck sleeve in the diameter-reducing direction easily occurs over substantially the entire length of the chuck sleeve. Therefore, the effective chucking length of the chuck sleeve can be increased with no accompanying increase in the overall length of the chuck sleeve.

In the conventional chuck, the change ratio of the inner diameter of the chuck sleeve can be increased to some extent when the clamp sleeve 5 disposed to surround the outer circumferential surface of the chuck sleeve 1C is tightened to a degree such that the end surface of the clamp sleeve 5 abuts the end surface of the flange 1B opposite the tapered shank portion 1A. However, if the tightening operation is continued even after the end surface of the clamp sleeve 5 has abutted the end surface of the flange 1B opposite the tapered shank portion 1A, the tightening force becomes excessive, whereby the chuck sleeve 1C deforms because of a torsion phenomenon. This causes a problem in that the torsional deformation of the chuck sleeve 1C causes deflective vibration in the tool holder 1 and a cutting tool fitted into the chuck sleeve when the tool holder 1 is rotated, making accurate cutting operation impossible.

SUMMARY OF THE INVENTION

The present invention has been accomplished to solve the above-mentioned problems, and an object of the invention is to provide a chuck which can prevent torsional deformation of a chuck sleeve, which would otherwise occur because of excessive tightening of a clamp sleeve against the chuck sleeve, to thereby eliminate adverse effects of the torsional deformation on the chuck sleeve, which in turn prevents deflective vibration in the chuck sleeve, which is a portion of a tool holder, to thereby improve machining accuracy.

The present invention provides a chuck comprising: a holder body having a shank portion for insertion into a spindle of a machine tool, a gripping flange formed at one end of the shank portion, and a chuck sleeve that extends from the flange in a direction away from the shank portion in alignment with an axis of the shank portion, the chuck sleeve having a tapered outer circumferential surface whose diameter decreases from a bottom end adjacent to the flange to a tip end of the chuck sleeve; a clamp sleeve fitted onto the outer circumference surface of the chuck sleeve such that the clamp sleeve is rotatable and axially movable relative to the chuck sleeve, the clamp sleeve having a tapered inner circumferential surface whose diameter decreases from a bottom end adjacent to the flange toward a tip end of the clamp sleeve; needle rollers disposed between the outer circumferential surface of the chuck sleeve and the inner circumferential surface of the clamp sleeve over the entire circumference, the needle rollers inclining in the circumferential direction at a predetermined angle with respect to the center axes of the chuck sleeve and the clamp sleeve, and the clamp sleeve being rotated to cause the needle rollers to revolve spirally along the outer circumferential surface of the chuck sleeve while rotating about their own axes in order to decrease and restore the diameter of the chuck sleeve; and a thrust member disposed between the end surface of the flange opposite the shank portion and a corresponding end surface of the clamp sleeve.

Preferably, a groove having a predetermined depth and a ring-like shape is formed in the end surface of the flange opposite the shank portion such that the groove extends along the outer circumference of the bottom end of the chuck sleeve through which the chuck sleeve is joined with the flange.

Preferably, a radially outer portion of the corresponding end surface of the clamp sleeve is raised so as to abut a radially outer portion of the thrust member.

Preferably, the thrust member is held by means of a thrust-member holder of an annular flat shape, the thrust-member holder having at a central portion an opening for allowing passage of the chuck sleeve therethrough, and an end of the thrust-member holder being accommodated in an annular groove formed in the end surface of the flange.

Preferably, the thrust-member holder includes an elastic member which is provided on the end of the thrust-member holder accommodated in the groove and engages with a wall surface of the groove so as to restrict movement of the thrust-member holder in the axial direction.

Preferably, at least one of opposite surfaces of the thrust member is surface treated so as to reduce friction resistance produced when the end surface of the clamp sleeve comes into contact with the thrust member.

In the chuck according to the present invention, the thrust member can prevent deformation, such as torsional deformation, of the chuck sleeve, which would otherwise occur because of excessive tightening of the clamp sleeve against the chuck sleeve, to thereby prevent adverse effects of the torsional deformation on the chuck sleeve, which in turn prevents deflective vibration in the chuck sleeve, which is a portion of a tool holder, to thereby improve machining accuracy.

Moreover, in the case where a groove having a predetermined depth is formed in the end surface of the flange opposite the shank portion such that the groove extends along the outer circumference of the bottom end of the chuck sleeve through which the chuck sleeve is joined with the flange, the chuck sleeve can be extended toward the flange side with no accompanying increase in the overall length of the holder body. The radially inward elastic deformation of the chuck sleeve in a bottom end area adjacent to the flange can be made substantially equal to that in the remaining area. In addition, the effective chucking length of the chuck sleeve over which the chuck sleeve can elastically deform in the diameter-reducing direction can be increased without an increase in the overall length of the holder body. As a result, elastic deformation of the chuck sleeve in the diameter-reducing direction occurs more easily, thereby allowing an operator to tighten the clamp sleeve with ease until the end surface of the clamp sleeve abuts the flange of the holder body, without need of large tightening force.

Moreover, when the clamp sleeve is tightened excessively, the end surface of the clamp sleeve slides because of presence of the thrust member, whereby torsional deformation of the clamp sleeve is reduced, and thus no torsional force is transmitted to the chuck sleeve. Thus, vibration, such as deflective vibration or chatter vibration, does not occur during machining by use of a tool, whereby cutting operation can be performed under favorable conditions, and machining accuracy can be improved.

Moreover, in the case where at least one of the opposite surfaces of the thrust member is surface treated so as to reduce friction resistance, even when the end surface of the clamp sleeve comes into contact with the thrust member because of excessive tightening of the clamp sleeve, only friction resistance of a reduced level is generated between the clamp sleeve and the thrust member, and thus sliding movement of the clamp sleeve is facilitated, whereby the function of the thrust member is improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 3A and 3B show a thrust member used in the first embodiment, wherein

FIGS. 8A and 8B show a thrust member used in the third embodiment, wherein

DETAILED DESCRIPTION OF PREFERRED EMBODIMENTS

Embodiments of the present invention will be described with reference to the accompanying drawings.

Figure 1:
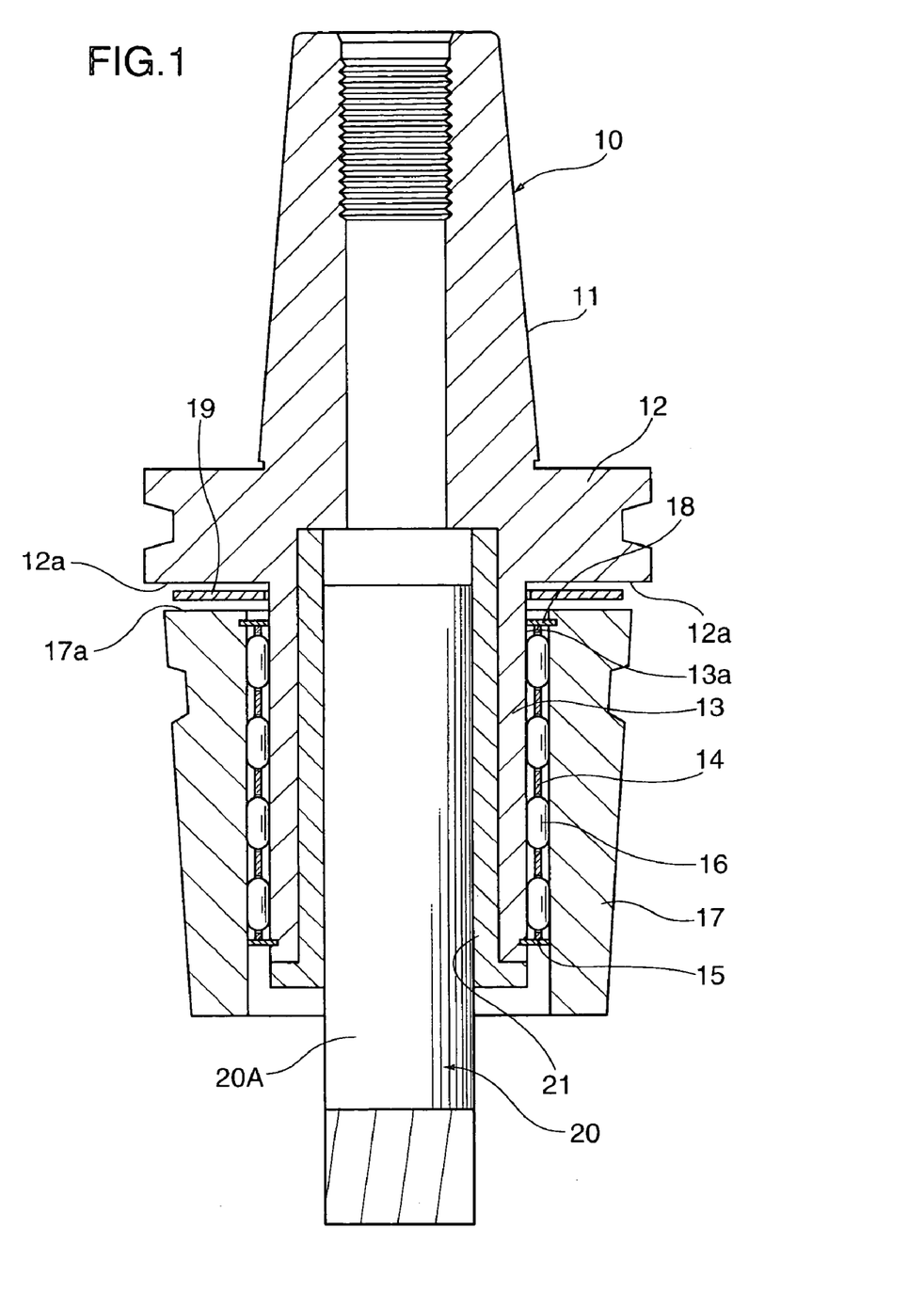
FIG. 1 is a cross-sectional view of a chuck according to a first embodiment of the present invention in a state in which a clamp sleeve is loosened.

First Embodiment:

FIG. 1 shows a cross-sectional view of a chuck according to a first embodiment of the present invention.

As shown in FIG. 1, the tool chuck has a holder body 10, which has a tapered shank portion 11 to be inserted into a spindle of an unillustrated machine tool, a gripping flange 12 formed at the larger-diameter end of the tapered shank portion 11, and a chuck sleeve 13 that extends from an end surface 12a of the flange 12 opposite the tapered shank portion 11. The chuck sleeve 13 extends in the direction away from the tapered shank portion 11 such that the axis of the chuck sleeve 13 coincides with the axis of the tapered shank portion 11. The chuck sleeve 13 has a tapered outer circumferential surface 13a whose diameter decreases from the bottom end adjacent to the flange 12 toward the tip end.

Reference numeral 14 denotes a roller-retaining sleeve fitted onto the outer circumference of the chuck sleeve 13 with a clearance therebetween. The diameter of the roller retaining sleeve 14 decreases toward the tip end thereof at the same rate as that of the tapered surface 13a of the chuck sleeve 13. The roller-retaining sleeve 14 is held by a retainer ring 15 provided on the outer circumference of the tip end portion of the chuck sleeve 13 such that the roller-retaining sleeve 14 is prevented from coming off the chuck sleeve 13.

In the roller-retaining sleeve 14, numerous needle rollers 16 are arranged in the circumferential direction to form a plurality of rows in the longitudinal direction. The needle rollers 16 are fitted into the roller-retaining sleeve 14 in such a manner that the needle rollers 16 incline in the circumferential direction at a predetermined angle with respect to the center axis of the roller retaining sleeve 14. Each of the needle rollers 16 has a diameter greater than the wall thickness of the roller-retaining sleeve 14, so that the portion of each needle roller 16 projecting inward from the inner circumferential surface of the roller-retaining sleeve 14 is in contact with the tapered surface 13a of the chuck sleeve 13, while the portion of each needle roller 16 projecting outward from the outer circumferential surface of the roller retaining sleeve 14 is in contact with the inner circumferential surface of a clamp sleeve 17, which will be described below.

The clamp sleeve 17 is adapted to reduce the diameter of the chuck sleeve 13 to thereby tightly chuck a desired tool. The clamp sleeve 17 is fitted onto the outer circumference of the chuck sleeve 13 via the needle rollers 16 held by the roller-retaining sleeve 14. The clamp sleeve 17 has a tapered inner circumferential surface whose diameter decreases from the end facing the flange 12 toward the tip end thereof. Further, a sealing/retaining ring 18 is attached to the inner circumference of the bottom end portion of the clamp sleeve 17 adjacent to the flange 12. The sealing/retaining ring 18 is in contact with the outer circumferential surface of the chuck sleeve 13 so as to provide a sealing function. The sealing/retaining ring 18 also abuts the end surface of the roller-retaining sleeve 14 in order to prevent the clamp sleeve 17 from coming off the chuck sleeve 13.

Figure 3A:
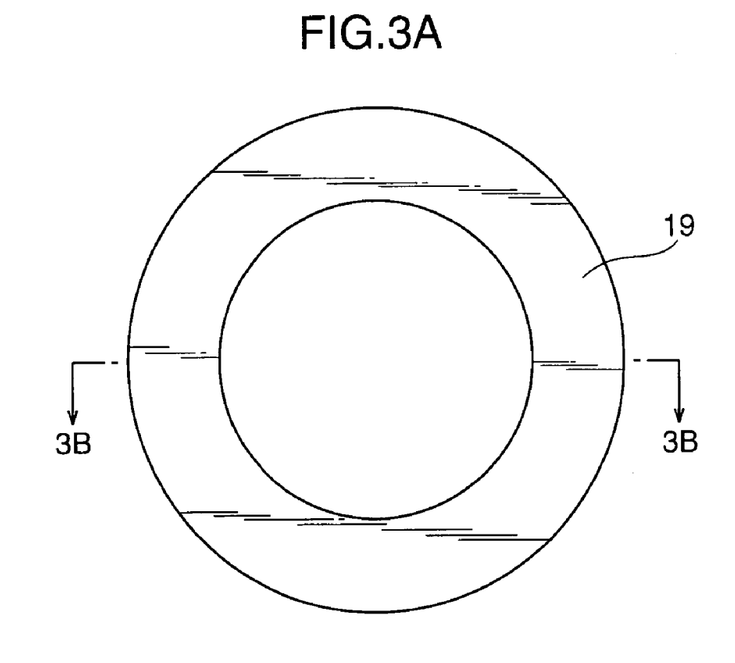
FIG. 3A is a plan view of the thrust member.
Figure 3B:
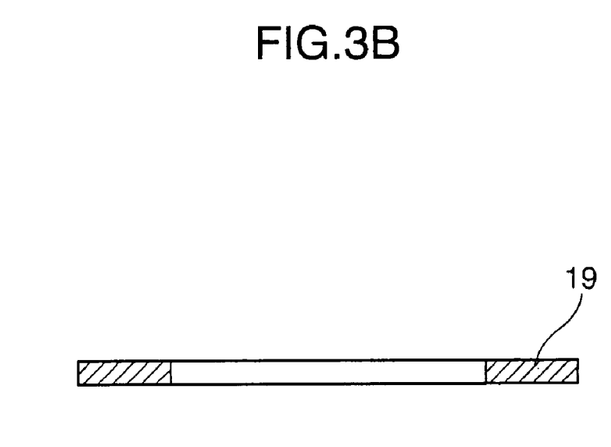
FIG. 3B is a cross-sectional view taken along line 3B—3B of FIG. 3A.

Reference numeral 19 denotes a thrust member, which assumes a flat annular shape and has a circular central opening, as shown in FIGS. 3A and 3B. The thrust member 19 is disposed between the end surface 12a of the gripping flange 12 opposite the tapered shank portion and a corresponding end surface 17a of the clamp sleeve 17, which is attached to the chuck sleeve 13. At least one of the opposite surfaces of the thrust member 19 (preferably, both the opposite surfaces of the thrust member 19) is surface treated by means of, for example, TiN coating, in order to reduce the coefficient of friction of the surface.

In the chuck of the first embodiment having the above-described structure, when a tool 20 is to be chucked, a spring collet 21 is fitted onto a shank 20A of the tool 20, and the shank 20A of the tool 20, together with the spring collet 21, is inserted into the cylindrical bore of the chuck sleeve 13. When the clamp sleeve 17 is rotated clockwise, each needle roller 16 in contact with the tapered inner surface of the clamp sleeve 17 revolves spirally along the outer surface of the chuck sleeve 13 while rotating about its own axis. Thus, the roller-retaining sleeve 14 moves toward the flange 12, while rotating, in accordance with the revolution of the needle rollers 16, and at the same time the clamp sleeve 17 also moves toward the flange 12. The movements of the roller-retaining sleeve 14 and the clamp sleeve 17 toward the flange 12 reduce the clearance between the tapered inner surface of the clamp sleeve 17 and the tapered outer surface of the chuck sleeve 13, so that the clamp sleeve 17 strongly presses the chuck sleeve 13 from the entire outer circumference thereof via the needle rollers 16 in order to reduce the diameter of the chuck sleeve 13. As a result, the shank 20A of the tool 20 inserted into the cylindrical bore of the chuck sleeve 13 is clamped and held by the chuck sleeve 13 via the spring collet 21 (see FIG. 2).

Figure 2:
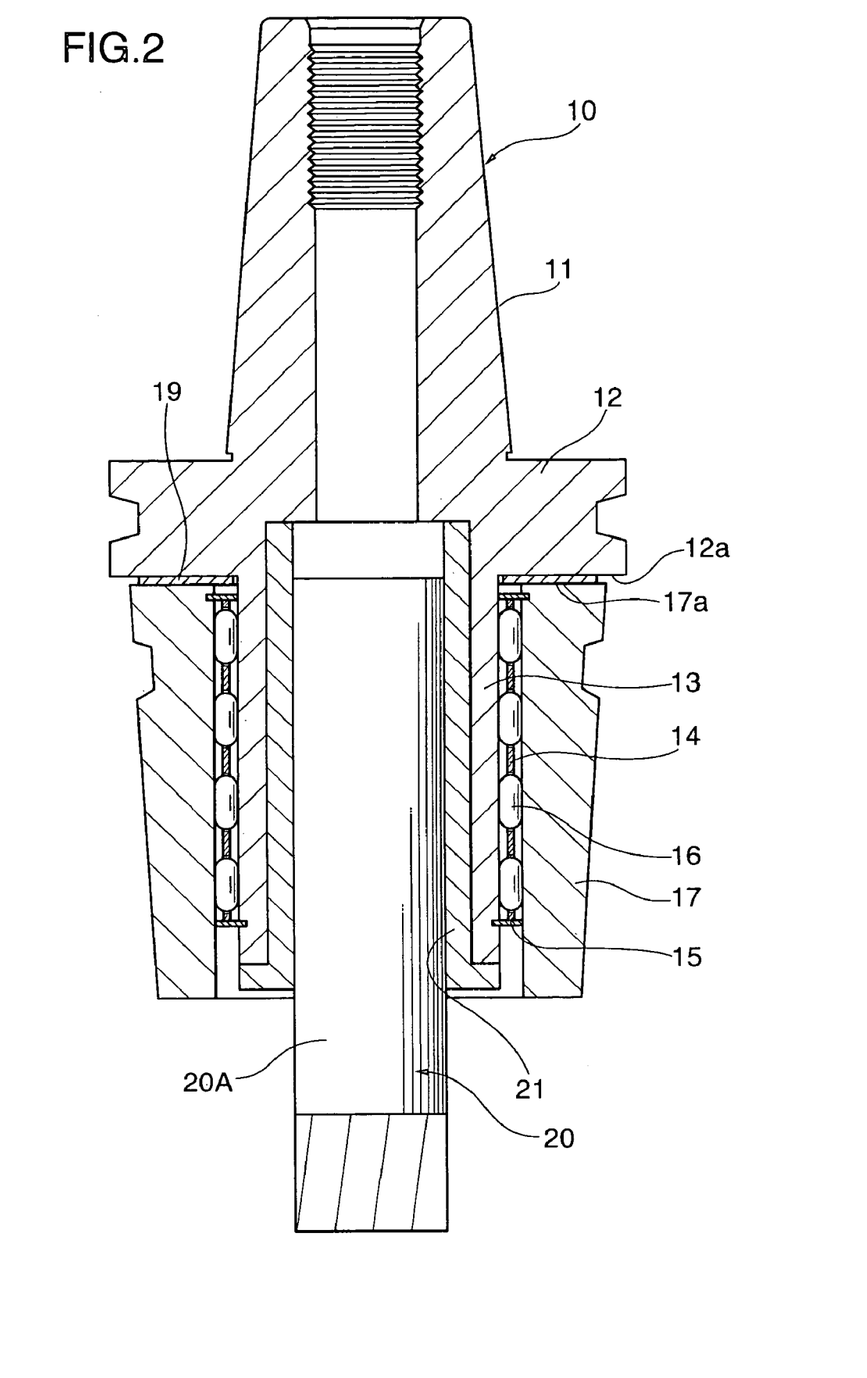
FIG. 2 is a cross-sectional view of the chuck according to the first embodiment in a state in which the clamp sleeve is tightened.

Upon tightening the clamp sleeve 17, one end surface of the thrust member 19 abuts the end surface 17a of the clamp sleeve 17, and the other end surface of the thrust member 19 abuts the end surface 12a of the flange 12, whereby the end surface 17a of the clamp sleeve 17 abuts the end surface 12a of the flange 12 via the thrust member 19. When the tightening operation is continued after such abutment, an excessive clamp force may be applied. However, the end surface 17a of the clamp sleeve 17 slides on the surface of the thrust member 19, to thereby prevent deformation, such as torsional deformation, of the clamp sleeve 17.

When the clamp sleeve 17 in a clamped state is rotated counterclockwise, the roller-retaining sleeve 14 moves toward the tip end of the chuck sleeve 13, and the clamp sleeve, 17 also moves in the same direction. Therefore, the diameter of the chuck sleeve 13 is restored to its original size, so that the clamping force applied to the tool 20 is released. This enables the tool 20 to be removed from the chuck sleeve 13 or to be replaced with a different tool.

Second Embodiment:

Next, a chuck according to a second embodiment of the present invention will be described.

Figure 4:
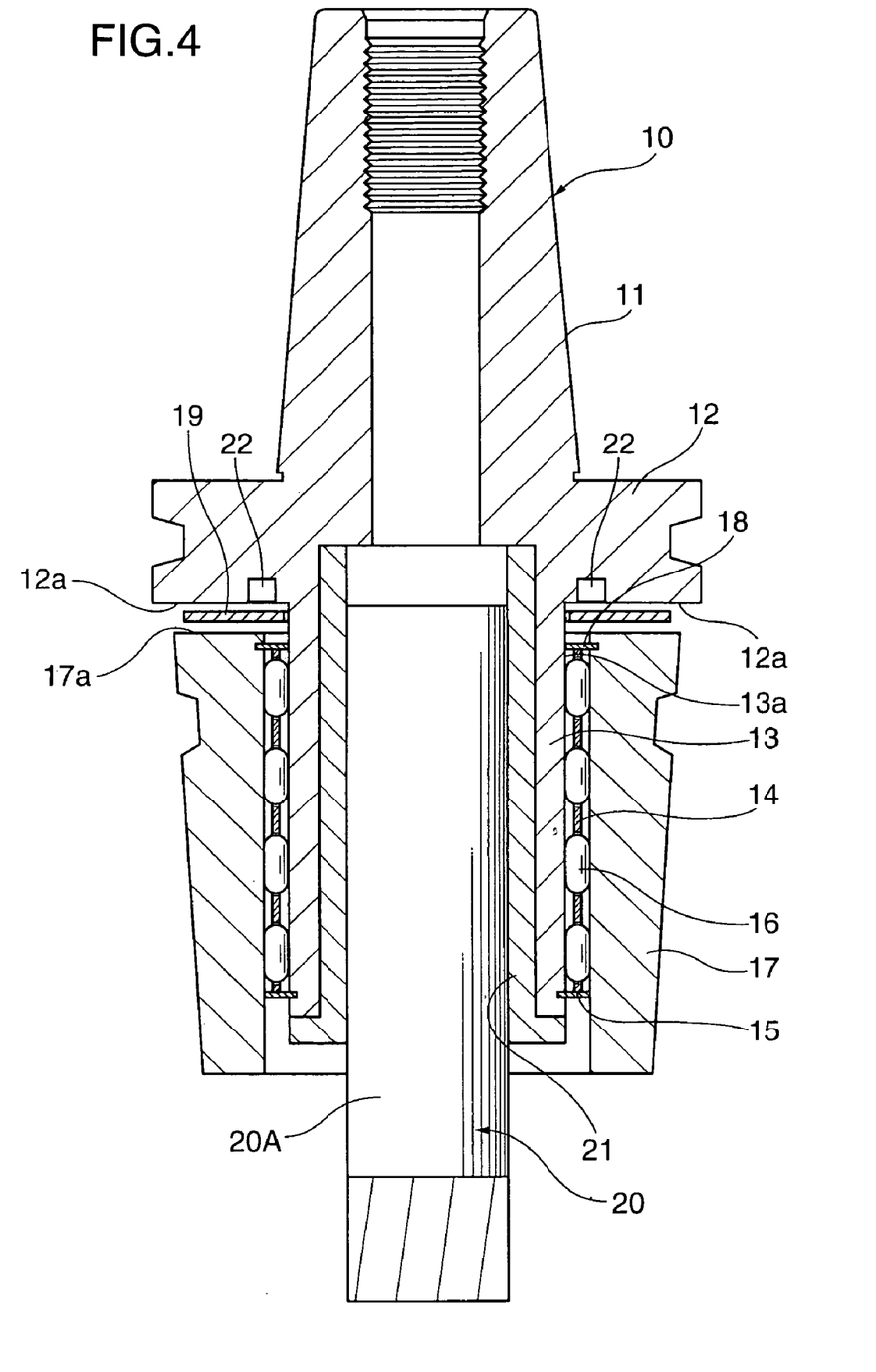
FIG. 4 is a cross-sectional view of a chuck according to a second embodiment of the present invention in a state in which a clamp sleeve is loosened.

The chuck of the second embodiment shown in FIG. 4 is identical with that of the first embodiment, except that in the end surface 12a of the flange 12 opposite the tapered shank portion, a groove 22 having a predetermined depth (approximately 2 to 5 mm) is formed, at the bottom portion of the chuck sleeve 13 through which the chuck sleeve 13 is joined with the flange 12, such that the groove 22 extends along the outer circumference of the chuck sleeve 13 to form a ring-like shape. The ring-shaped, groove 22 allows the chuck sleeve 13 to be extended toward the flange 12 side without changing the tool length L1 of the holder body 10.

By virtue of the above-described structure, the radially inward elastic deformation of the chuck sleeve 13 in a bottom end area adjacent to the flange 12 is made substantially equal to that in the remaining area of the chuck sleeve 13.

Since the remaining portions are identical with those of the first embodiment shown in FIG. 1, those portions are denoted by the same reference numerals, and their repeated descriptions are omitted.

Figure 5:
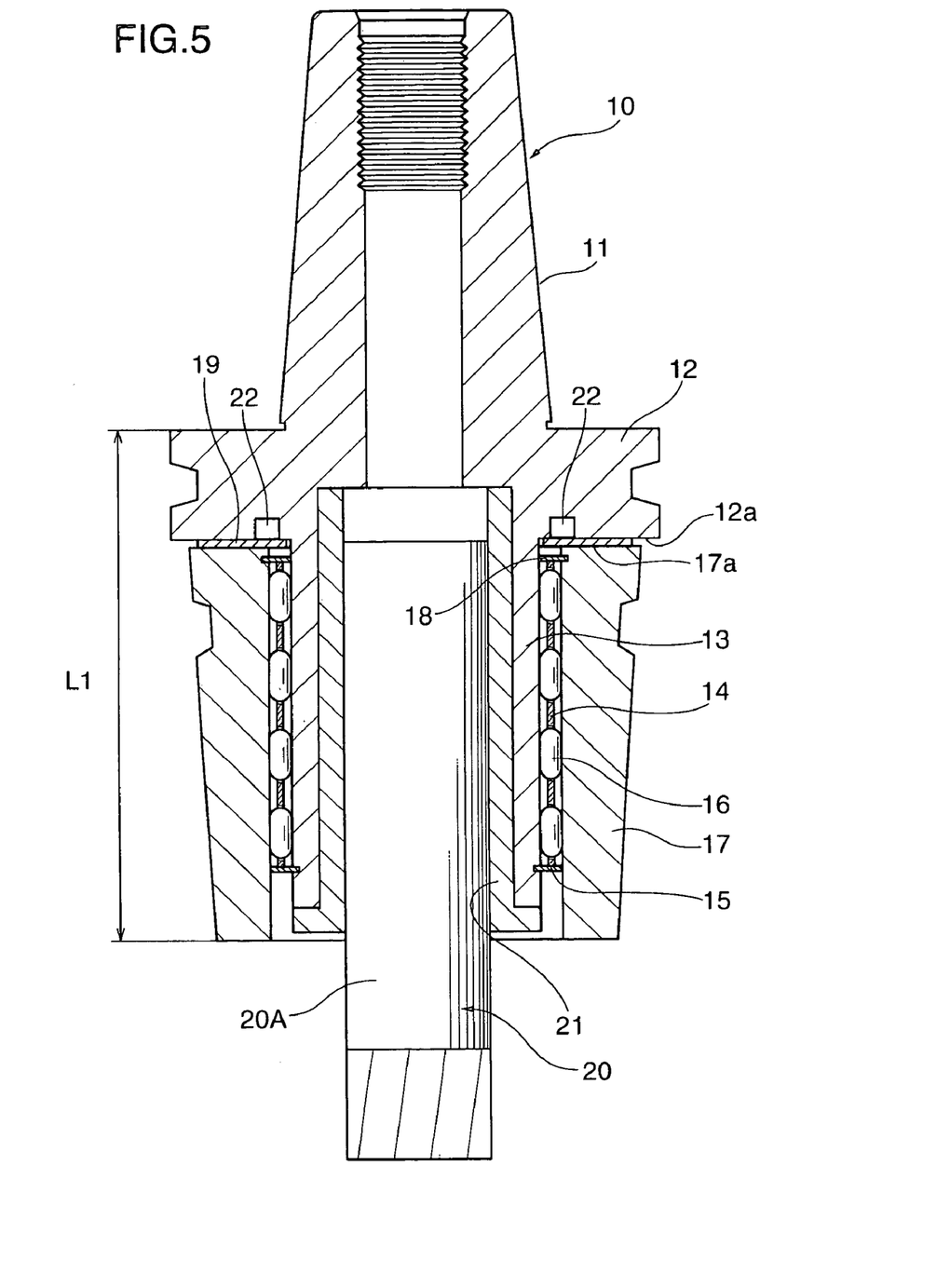
FIG. 5 is a cross-sectional view of the chuck according to the second embodiment in a state in which the clamp sleeve is tightened.

The chuck of the second embodiment has the same deformation prevention function as that of the first embodiment. That is, even when an excessive clamp force is applied because of a tightening operation continued after abutment, deformation, such as torsional deformation, of the clamp sleeve 17 can be prevented, because the end surface 17a of the clamp sleeve 17 slides on the surface of the thrust member 19. In addition, the clamp sleeve 17 can be tightened with ease until the end surface 17a of the clamp sleeve 17 abuts the end surface 12a of the flange, without need of large tightening force, whereby a sufficiently large chucking force can be applied to the tool shank 20A in an area corresponding to the bottom end of the chuck sleeve 13 through which the chuck sleeve 13 is joined with the flange 12. Moreover, the radially inward elastic deformation of the chuck sleeve 13 in a bottom end area adjacent to the flange 12 can be made substantially equal to that in the remaining area.

Furthermore, since a larger chucking force can be applied to the tool shank 20A in the bottom end of the chuck sleeve 13 through which the chuck sleeve 13 is joined with the flange 12, even when heavy cutting is performed, the tool 20 is prevented from causing defecting movement about the tip end of the chuck sleeve 13. Further, this structure can prevent rubbing between the outer circumferential surface of the tool shank 20A and the inner wall surface of the chuck sleeve 13, to thereby prevent damage to the outer circumferential surface of the tool shank 20A and the inner wall surface of the chuck sleeve 13.

Figure 7:
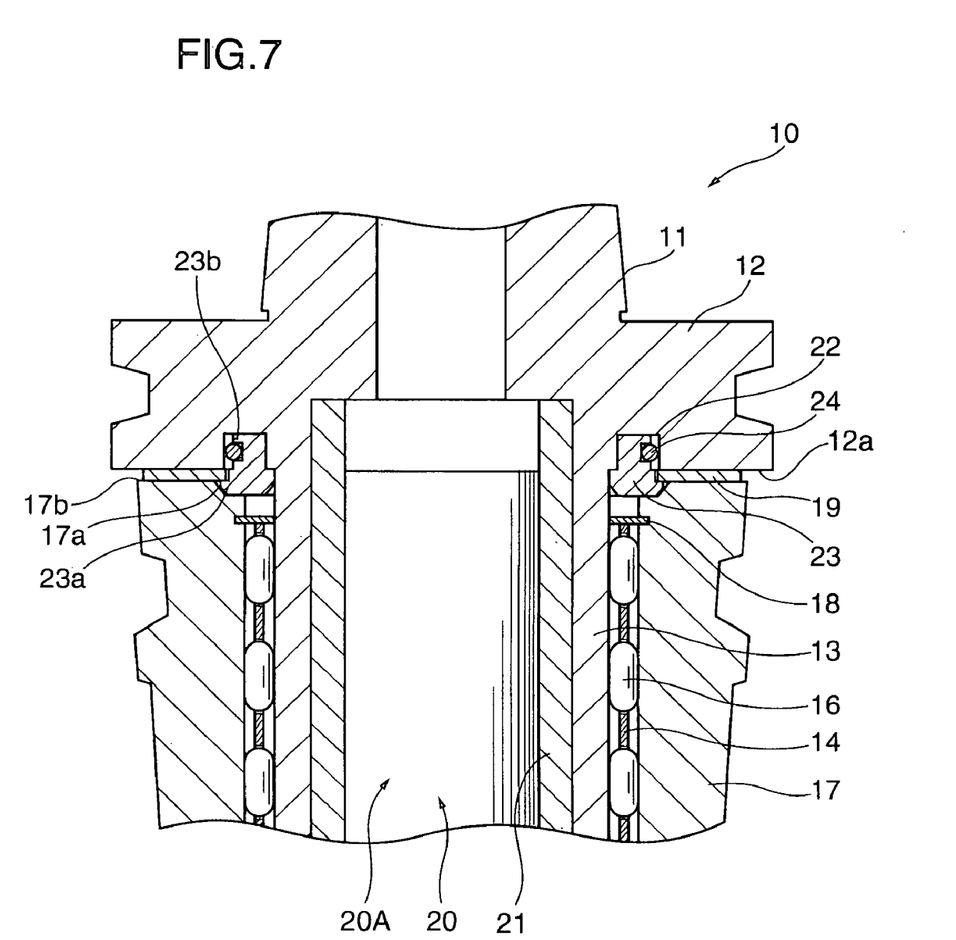
FIG. 7 is a cross-sectional view of the main portion of the chuck according to the third embodiment in a state in which the clamp sleeve is tightened.
Figure 8A:
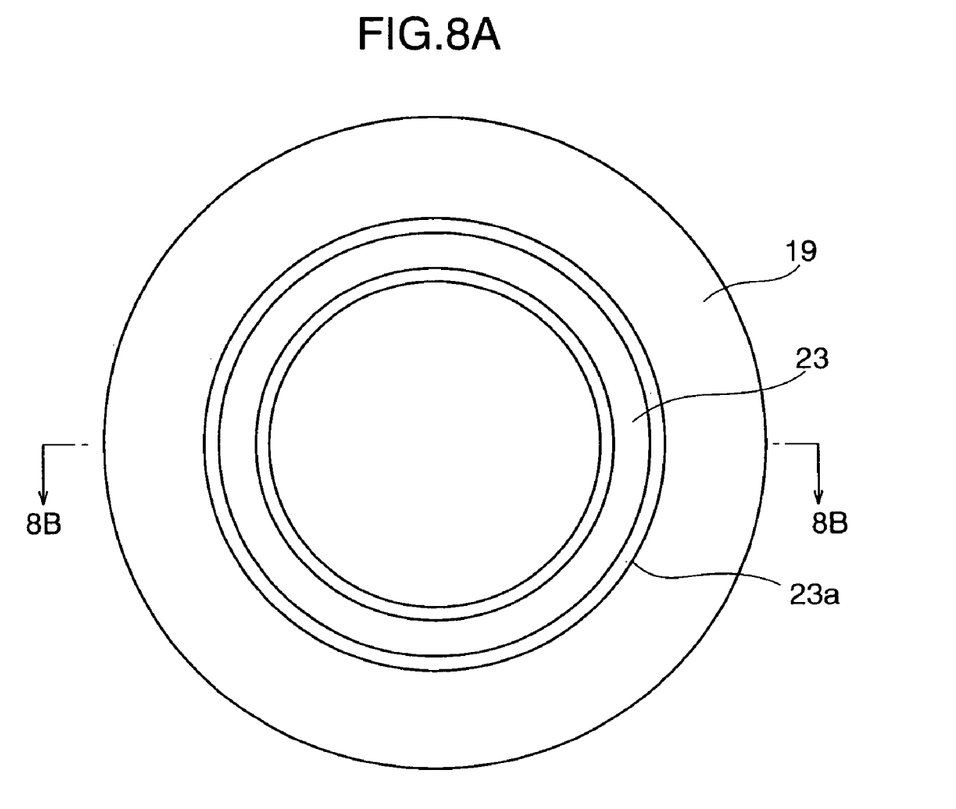
FIG. 8A is a plan view of the thrust member.
Figure 8B:
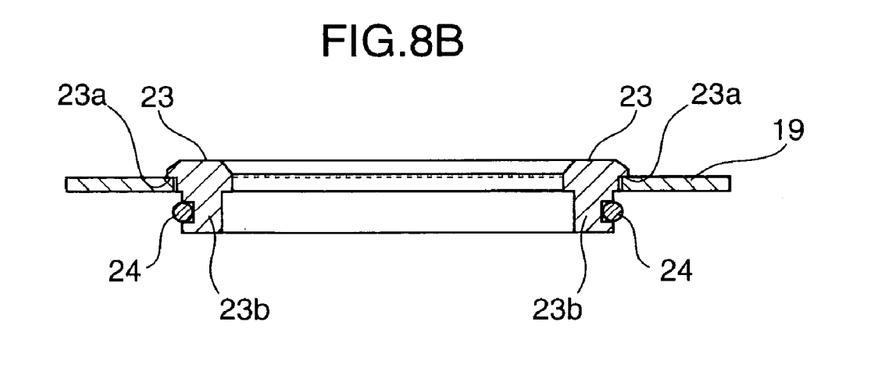
FIG. 8B is a cross-sectional view taken along line 8B—8B of FIG. 8A.

Third Embodiment:

Next, a chuck according to a third embodiment of the present invention will be described with reference to FIGS. 6 to 8.

Figure 6:
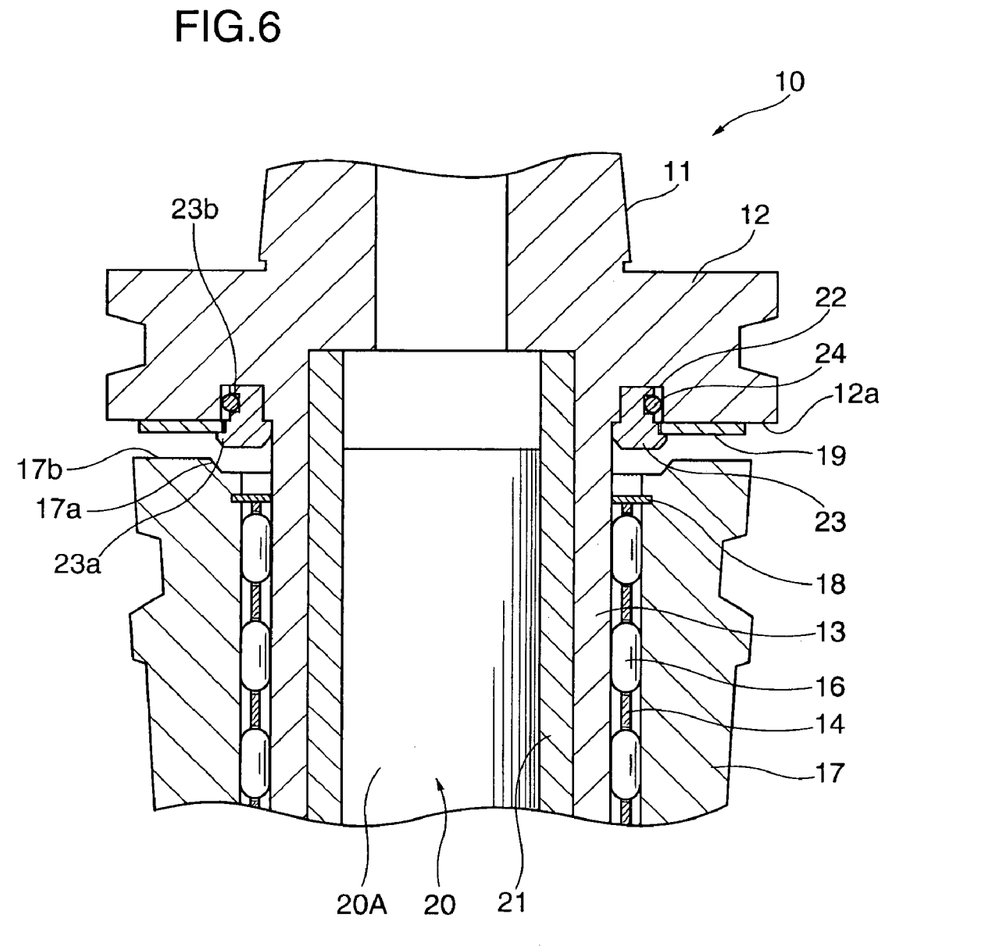
FIG. 6 is a cross-sectional view of a main portion of a chuck according to a third embodiment of the present invention in a state in which a clamp sleeve is loosened.

In FIG. 6, structural elements identical with those shown in FIGS. 1 to 5 are denoted by the same reference numerals, and their repeated descriptions are omitted. Only portions different from those shown in FIGS. 1 to 5 will be mainly described.

The feature of the chuck according to the third embodiment resides in that the annular groove 22 is formed in the end surface of the flange 12 in order to increase the effective length of the chuck sleeve 13, and that a thrust-member holder 23 is provided in order to prevent play or movement of the thrust member 19 along the axial direction.

In the chuck of the third embodiment, the thrust-member holder 23 is fitted into the central opening of the thrust member 19. The thrust-member holder 23 has an opening for allowing passage of the chuck sleeve 13 therethrough, and a stepped portion 23a which projects outward from a first end of the thrust member holder 23 for engagement with the edge portion of the central opening of the thrust member 19. An elastic member 24, such as an O-ring, is fitted into a circumferential groove formed at a second end of the thrust-member holder 23. When the second end of the thrust-member holder 23 is fitted into the groove 22, the elastic member 24 engages with the wall surface of the groove 22 to thereby prevent axial movement of the thrust-member holder 23.

Accordingly, the thrust member 19 in engagement with the stepped portion 23a of the thrust member holder 23 is prevented from playing or moving in the axial direction after tightening of the clamp sleeve 17.

In the third embodiment, a radially outer portion of the end surface 17a of the clamp sleeve 17, which portion comes into contact with the thrust member 19, is raised in the axial direction so as to form a raised portion 17b. Thus, the raised portion 17b abuts a radially outer portion of the thrust member 19.

Fourth Embodiment:

Next, a chuck according to a fourth embodiment of the present invention will be described with reference to FIGS. 9 and 10.

Figure 9:
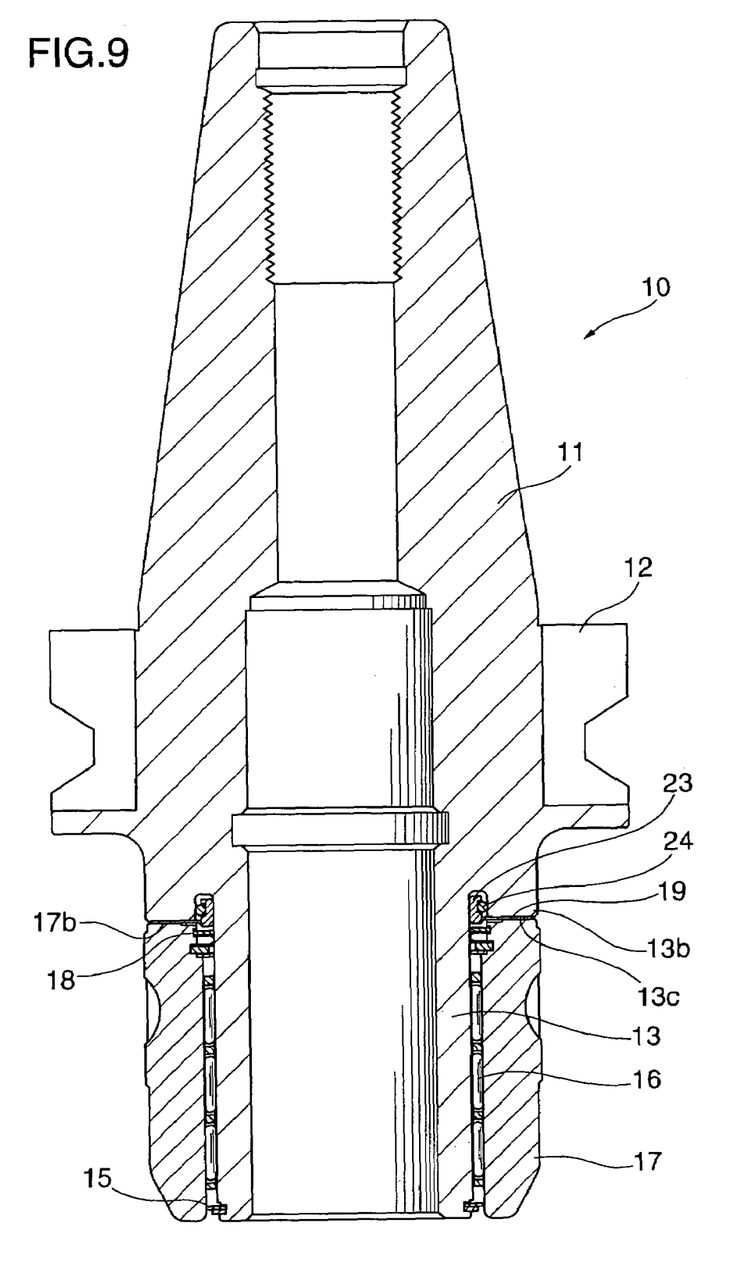
FIG. 9 is a cross-sectional view of a chuck according to a fourth embodiment of the present invention in a state in which a clamp sleeve is tightened.
Figure 10:
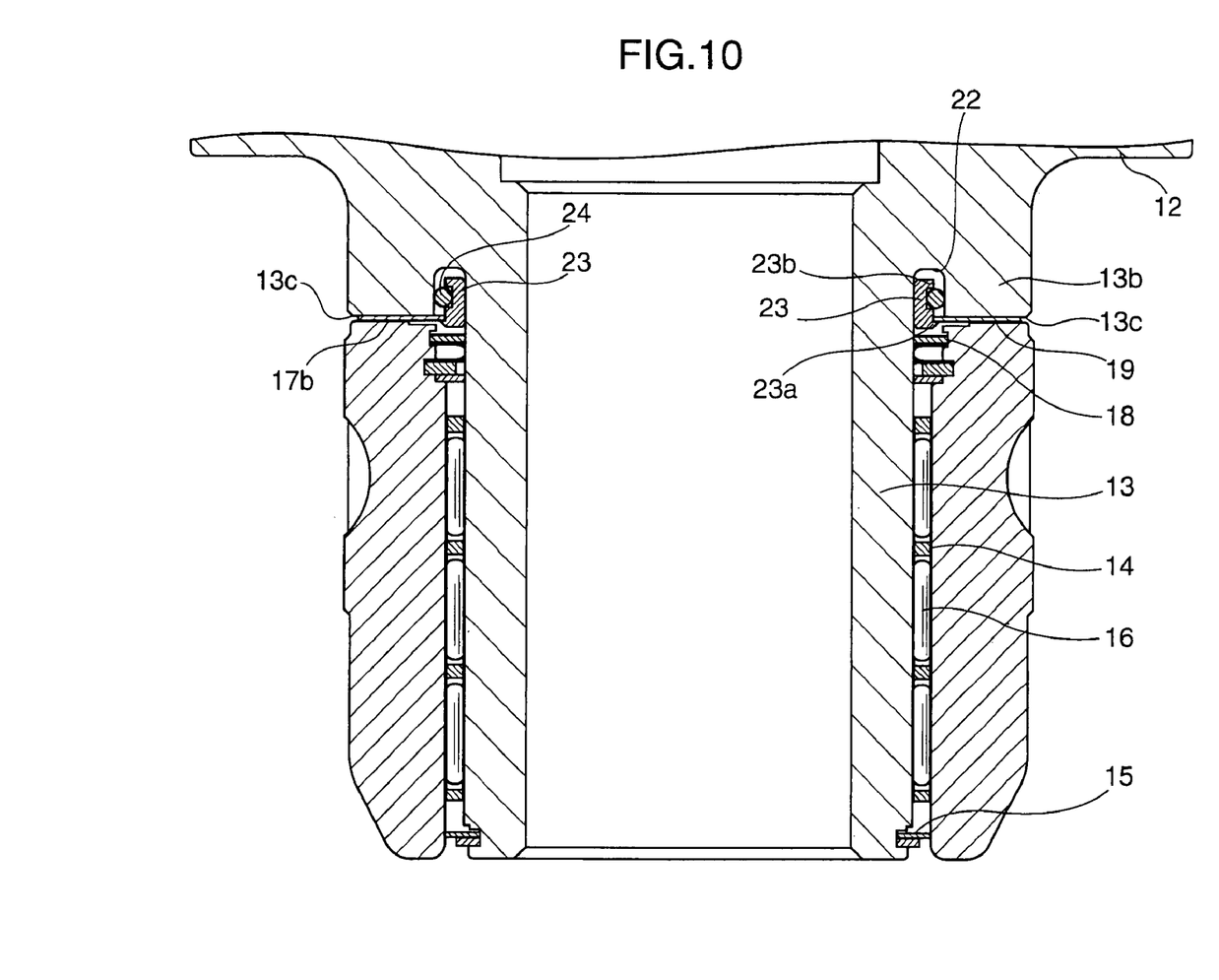
FIG. 10 is a cross-sectional view of a main portion of the chuck according to the fourth embodiment in a state in which the clamp sleeve is tightened.

In FIG. 9, structural elements identical with those shown in FIGS. 1 to 8 are denoted by the same reference numerals, and their repeated descriptions are omitted. Only portions different from those shown in FIGS. 1 to 8 will be mainly described.

The feature of the chuck according to the fourth embodiment resides in the shape of the chuck sleeve 13. The chuck sleeve 13 has a larger diameter portion 13b extending from the flange 12 in the direction opposite the shank portion, and a smaller diameter portion extending from the large diameter portion 13b via a stepped portion 13c. The clamp sleeve 17 is fitted onto the outer circumference of the smaller diameter portion of the chuck sleeve 13 via needle rollers 16.

Figure 11:
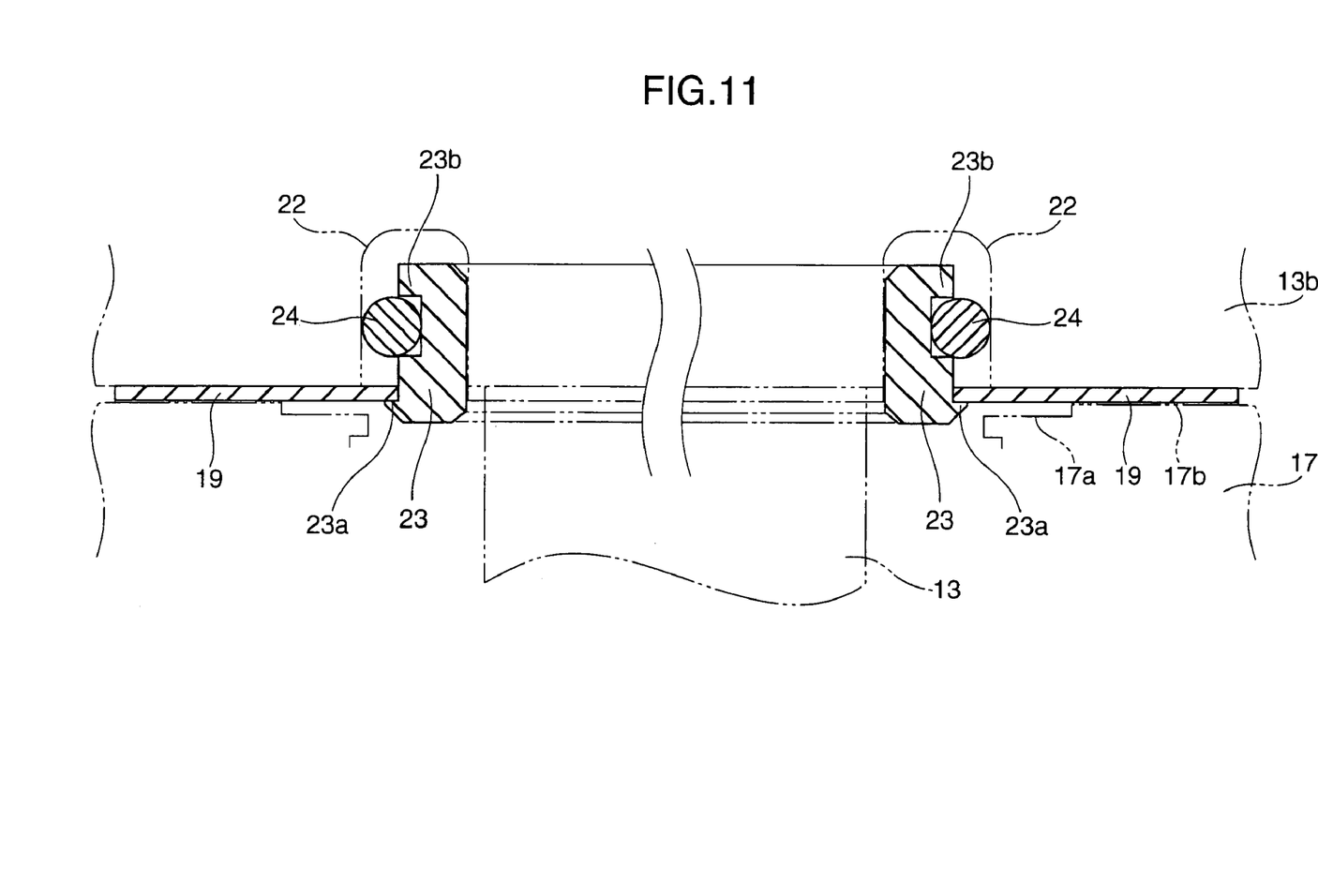
FIG. 11 is a partial, enlarged cross-sectional view of a thrust member and a thrust member holder used in the fourth embodiment.

An annular groove 22 is formed in the stepped portion 13c in such a manner that an inner wall surface is substantially flush with the outer circumference of the smaller diameter portion of the chuck sleeve 13. The second end of the thrust-member holder 23 carrying the thrust member 19 is fitted into the groove 22. Thus, by the action of the elastic member 24, axial movement of the thrust-member holder 23 is prevented. Moreover, in the present embodiment, the outer circumferential surface of the larger diameter portion 13b of the chuck sleeve 13 is flush with the outer circumferential surface of the clamp sleeve 17.

Since the remaining structure is identical with those of the above-described embodiments, description therefor is omitted. Needless to say, the chuck of the fourth embodiment are expected to provide the same action and effects as those of the above-described embodiments.

Obviously, numerous modifications and variations of the present invention are possible in light of the above teachings. It is therefore to be understood that within the scope of the appended claims, the present invention may be practiced otherwise than as specifically described herein.

What is claimed is:

1. A chuck comprising:
   a holder body having a shank portion for insertion into a spindle of a machine tool, a gripping flange formed at one end of said shank portion, and a chuck sleeve that extends from said flange in a direction away from said shank portion in alignment with an axis of said shank portion, said chuck sleeve having a tapered outer circumferential surface whose diameter decreases from a bottom end adjacent to said flange to a tip end of said chuck sleeve;
   a clamp sleeve fitted onto the outer circumference surface of said chuck sleeve such that said clamp sleeve is rotatable and axially movable relative to said chuck sleeve, said clamp sleeve having a tapered inner circumferential surface whose diameter decreases from a bottom end adjacent to said flange toward a tip end of said clamp sleeve;
   needle rollers disposed between the outer circumferential surface of said chuck sleeve and the inner circumferential surface of said clamp sleeve over the entire circumference, said needle rollers inclining in the circumferential direction at a predetermined angle with respect to the center axes of said chuck sleeve and said clamp sleeve, and said clamp sleeve being rotated to cause said needle rollers to revolve spirally along the outer circumferential surface of said chuck sleeve while rotating about their own axes in order to decrease and restore the diameter of said chuck sleeve; and
   a thrust member disposed between an end surface of said flange opposite said shank portion and a corresponding end surface of said clamp sleeve, wherein said thrust member is held by means of a thrust-member holder of an annular flat shape, said thrust-member holder having at a central portion an opening for allowing passage of said chuck sleeve therethrough, and an end of said thrust-member holder being accommodated in an annular groove formed in the end surface of said flange, wherein said thrust-member holder includes an elastic member which is provided on the end of said thrust-member holder accommodated in the groove and engages with a wall surface of the groove so as to restrict movement of said thrust-member holder in the axial direction.

2. A chuck according to claim 1, wherein a groove having a predetermined depth and a ring-like shape is formed in an end surface of said flange opposite said shank portion such that said groove extends along the outer circumference of the bottom end of said chuck sleeve through which said chuck sleeve is joined with said flange.

3. A chuck according to claim 1, wherein a radially outer portion of the corresponding end surface of the clamp sleeve is raised so as to abut a radially outer portion of said thrust member.

4. A chuck according to claim 1, wherein at least one of opposite surfaces of said thrust member is surface treated so as to reduce friction resistance produced when the end surface of said clamp sleeve comes into contact with said thrust member.

* * * * *